United States Patent

[11] 3,613,553

| [72] | Inventor | Samuel J. Popeil<br>Chicago, Ill. |
|---|---|---|
| [21] | Appl. No. | 841,338 |
| [22] | Filed | July 14, 1969 |
| [23] | | Division of Ser. No. 497,849, Oct. 19, 1965,<br>Pat. No. 3,484,252. |
| [45] | Patented | Oct. 19, 1971 |
| [73] | Assignee | Popeil Brothers, Inc.<br>Chicago, Ill. |

[54] APPARATUS FOR PUFFED POTATO PRODUCT
3 Claims, 12 Drawing Figs.

[52] U.S. Cl.................................................... 99/426,
99/403, 99/448, 99/450
[51] Int. Cl..................................................... A47j 43/18
[50] Field of Search........................................... 99/426,
100, 100 P, 193, 403, 409, 410, 411, 441, 443, 426

[56] References Cited
UNITED STATES PATENTS

| 1,076,383 | 10/1913 | Mendez | 99/426 |
| 1,265,627 | 5/1918 | Dickey | 99/426 |
| 2,177,193 | 10/1939 | Watts | 99/411 UX |
| 2,907,659 | 10/1959 | Anetsberger et al. | 99/410 X |
| 3,013,485 | 12/1961 | Leiby | 99/409 X |
| 3,242,849 | 3/1966 | Wells | 99/411 |

Primary Examiner—Walter A. Scheel
Assistant Examiner—Arthur O. Henderson
Attorney—Dominik, Knechtel, Godula ABSTRACT: A hot oil bath rack for making intermediate potato puffs, said rack having a plurality of compartments to partially puff raw potato slices, said compartments having perforated portions to admit hot oil and having a lid to constrain the slices in substantially vertical orientation, and said compartments having a width from about one-half to about one inch to limit the partial extension of the intermediate potato puff.

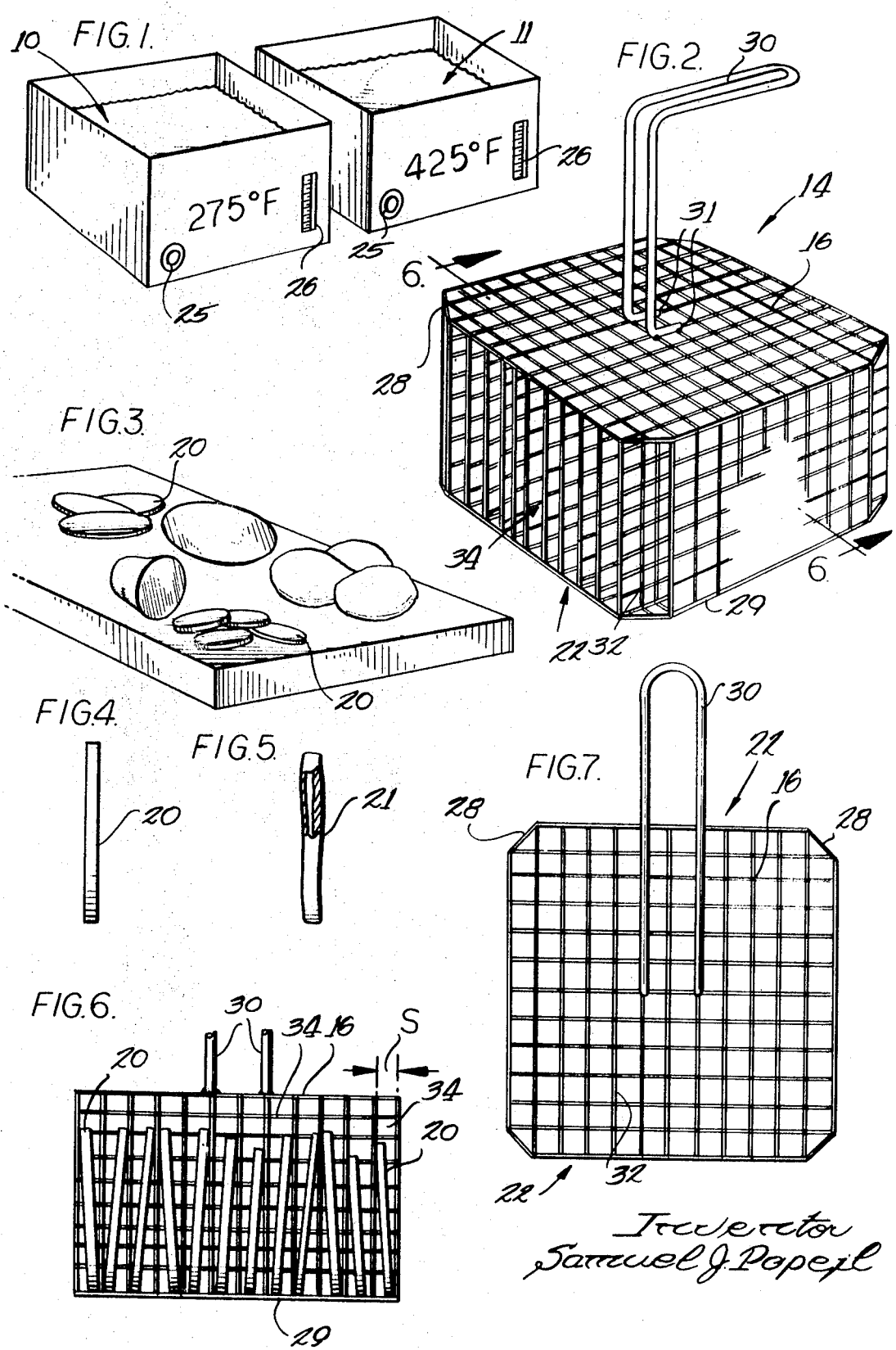

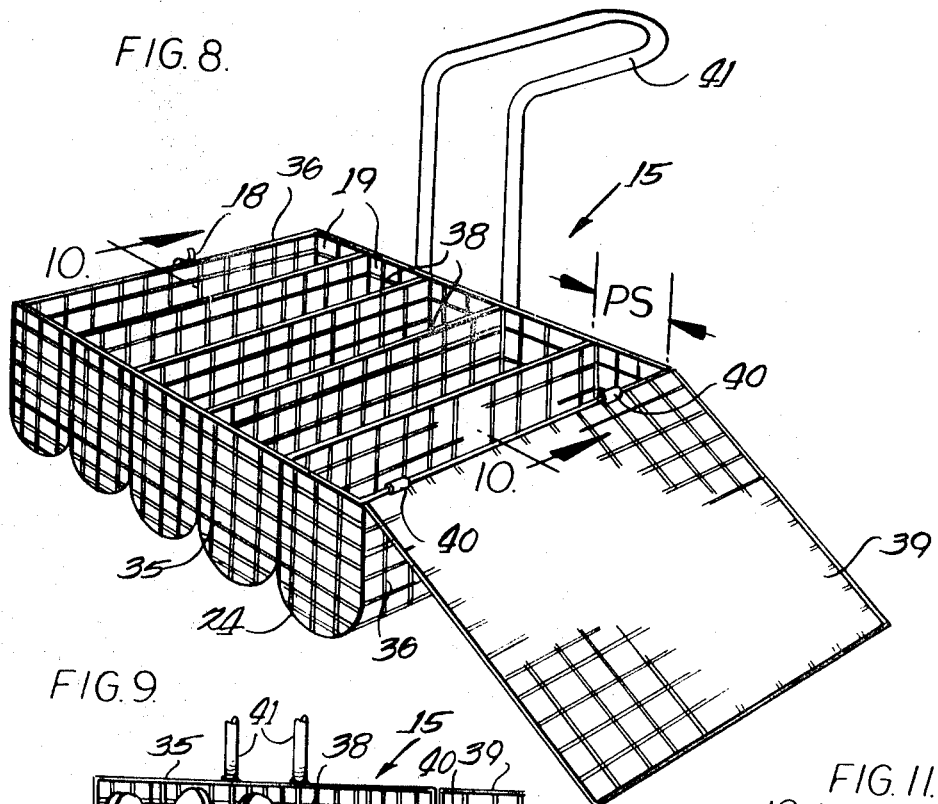
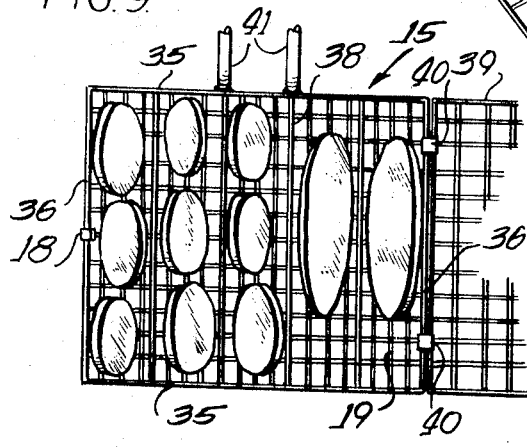
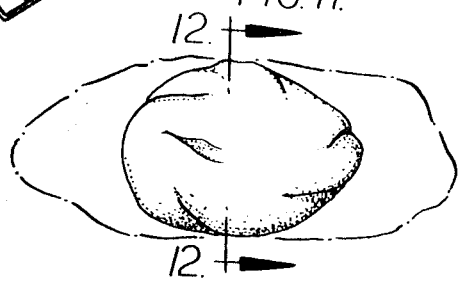
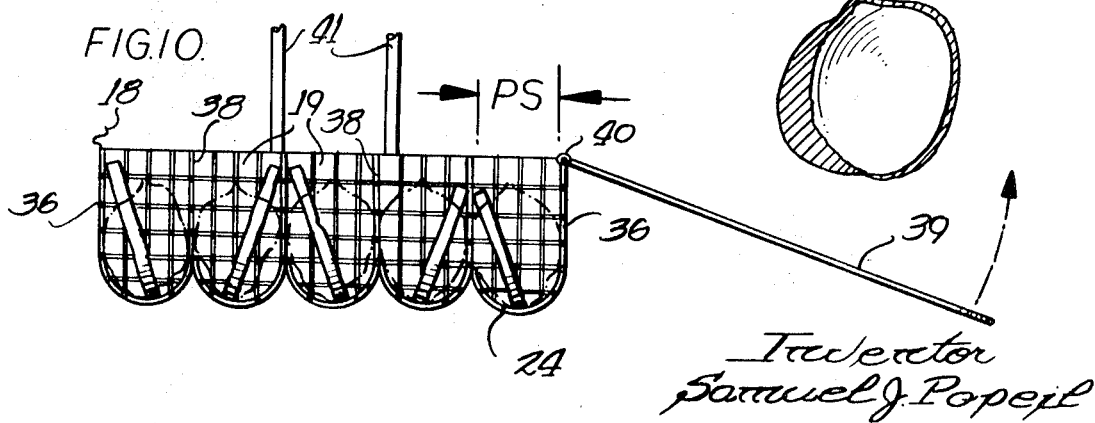

APPARATUS FOR PUFFED POTATO PRODUCT

The present invention relates to an apparatus for cooking an improved puffed potato product. This application is a Divisional Application of U.S. Application Ser. No. 497,849, filed Oct. 19, 1965, now U.S. Pat. No. 3,484,252, by the applicant named therein.

Puffed potatoes or potato souffle have been known for years. They have generally been prepared by first slicing potatoes to a thickness approximately one-eighth of an inch. Thereafter, according to some recipes the slices are soaked in ice water, drained, and dried. Subsequently they are fried in a frying pan in deep fat or other hot oil bath at a 275° temperature for about five minutes.

Thereafter the slices are removed and refrigerated. After complete cooking, a second oil bath is heated to 425° F. and the precooked slices are dropped into the hot oil bath and turned until the interior section ruptures and, due to the evaporation of the moisture in the potato as steam, the slices puff into round or elliptically shaped potato puffs. When suitably browned the puffs are removed from the hot oil bath, salted, and eaten. Additional recipes for the preparation of potato puffs or potato souffles are found in the following cookbooks or textbooks, along with a brief note as to their special emphasis:

The Gourmet Cookbook
Published by Gourmet Distr. Corp., New York
(1960 Edition) Copyright 1950
Page 198-Idaho or Maine Potatoes (Recommended)
Joy Cookbook
Published by Bobbs-Merrill Co., Inc.
Indianapolis, Indiana (1964)
Page 294-Idaho or Burbanks. Holland Potatoes (Best) cut with grain 25 min., ice water agitation
(numerous detailed steps)
Larousse Gastrononique
Published by Crown Publishers, Inc., New York, 1961
Page 769-Special Fat or Oil discussed
The Art of French Cooking
Published by Golden Press, New York, 1962
Page 510-Dutch Potatoes (recommended)
The Settlement Cookbook
Published by Simon & Schuster, New York, 1965
Page 403

Partial puffing, at best, results from following the prior art recipes. Furthermore, the majority of the potato slices in the prior art recipes will not puff at all. In addition, two baths of hot oil are required and the conditions for control to achieve even a limited yield are numerous and difficult to supervise. In the event a slight deformation appears in any of the potato slices during the first or second portion of the treatment they usually will not expand. Also expansion may be limited, or one side may remain flat. In addition, it is difficult or impossible to freeze any of the potato puffs made in accordance with the prior art processes. Existing restaurant equipment is not available for controlling the process properly, and quite obviously then in the household kitchen two deep fat fryers with closely controlled temperatures are an impractical luxury. Also the use of tongs, spatulas, or other control device for turning the slices or puffs to achieve even browning have a strong tendency to puncture and deflate the puffs.

It is therefore an object of the present invention to provide an improved apparatus to prepare an intermediate frozen potato puff product which, upon thawing and warming, can be dropped into hot oil at approximately 400° F. for less than two minutes and produce a very high yield of fully puffed symmetrical potatoes.

Another object of the present invention is to provide a submerging racking apparatus which will insure a high degree of uniformity in the preparation of an intermediate frozen potato product. A related object of the invention looks to the provision of a second submerging racking apparatus for the finalization of the method to produce the fully puffed potato in a safe, efficient, and economical manner.

A further advantage of the invention results from the apparatus which can be used to produce a high yield and quality from almost any grade, brand, or species of potato.

Further objects and advantages of the present invention will become apparent as the following description of an illustrative embodiment proceeds taken in conjunction with the drawings attached hereto for purposes of illustration only in which:

FIG. 1 is a perspective partially diagrammatic view of a two bath hot oil system usable in the preparation of the potato puffs of the invention.

FIG. 2 is a perspective view of the rack employed in the first or low-temperature step in the method of the preparation of potato puffs.

FIG. 3 is a perspective view illustrating how the potato slices may be prepared for use in the potato puff process of the invention.

FIG. 4 is an end view of a typical raw potato slice prior to processing.

FIG. 5 is an end view partially cut away of a partially processed potato.

FIG. 6 is a transverse sectional view of the first step potato rack illustrated in FIG. 2 and taken along section line 6—6 of FIG. 2.

FIG. 7 is a top view of the first stage rack shown in FIGS. 2 and 6.

FIG. 8 is a perspective view of the rack employed in the second or final step of the method for the preparation of potato puffs and which may be used by restaurants, in the home, and the like.

FIG. 9 is a top view of the second stage rack shown in FIG. 8.

FIG. 10 is a transverse sectional view of the second stage and final stage potato puffing rack taken along section line 10—10 of FIG. 8.

FIG. 11 is a front elevation of a potato puff made from a transverse slice. The phantom lines illustrate the configuration of a potato puff made from a similar potato but along a longitudinal slice.

FIG. 12 is a transverse sectional view of the potato puff shown in FIG. 11 taken along section line 12—12 thereof.

As set forth above, it has been known in the past that potato puffs can be made by frying potatoes in two separate baths, the first at approximately 275° F. and the later at approximately 425° F. The present invention stems from the discovery that uniformity, high yields, and an intermediate product which may be frozen and stored for subsequent use can be readily prepared if the necessary steps of completely submerging the potato slices in an oil bath, and confining the potato slices along their edge portions, with a preferred orientation in a vertical plane are performed in both of the hot baths.

To prepare potato puffs in accordance with the present invention, any potatoes of convenient size may be used. The potatoes are first peeled. After peeling no washing, chilling, or other processing steps are required. The potatoes are then sliced either longitudinally or transversely depending upon whether the potato puff is to have the configuration of a ball or a banana. The slices have a height corresponding to the height of the whole potato. The slices may vary in thickness between one-eighth inch and three-sixteenths inch. The one-eighth inch slices when puffed are generally crisper, whereas the three-sixteenth inch slices when puffed conform more fully to the product of the subject invention in which one side of the puff is thin whereas the other side (or opposed portions) has the remaining meat of the potato clinging to it, thereby retaining the potato flavor and texture.

The slices are then readied for complete immersion in a hot oil or fat bath at approximately 275° F. by placing them in a first rack 14 which is heavily perforated, and in which the vertical sidewall spacing S (see FIG. 6) is approximately one-half inch apart. In the first step it is preferred to confine the slices for partial expansion. Also, it is necessary to achieve the full immersion by edge contact on the slices. Therefore, a cover or lid 16 is provided on the first rack 14 so that the raw slices can be completely submerged.

The raw slices as racked and as shown in FIG. 6 of the accompanying drawings are then dropped into the 275° F. bath 10 (See FIG. 1) for approximately six minutes. They are then removed, and plunged for approximately five seconds into the 425° F. bath 11 and completely submerged for that period of time. A rapid bubbling or boiling action will be observed on the surface of the 425° F. oil bath 11. A partial interior separation of the meat will occur in all of the slices (see FIG. 5). The exterior will become brown and form a surface or exterior seal.

After removing the thus preprepared intermediate or ruptured potato puffs, the first rack 14 is then permitted to drain at room temperature for approximately two to five minutes. At some time between one and one-half and two and one-half minutes the potatoes will begin to collapse which have partially inflated in the fast plunge in the 425° F. bath. By shaking the first rack 14 with its open end 22 downwardly, the preprepared potato puffs will drop out once they are fully deflated. An alternative rack with a removable cover or lid 16 will also serve as an alternative construction. After approximately five minutes of cooling the intermediate or ruptured potato puffs 21 will have deflated and are ready to be packed, layered and frozen. No particular technique is required except that the slices are desirably separated from each other at this stage. It is possible, of course, to transfer the intermediate puffs 21 directly to the second rack 15 and complete the process.

In the event the process is to be continued, the intermediate puffs 21 are dropped in the second rack 15 as shown in FIG. 10, the lid 39 is closed and locked in place by means of the latch 18, and the second rack 15 plunged into the hot bath 11 for a period of time between 30 seconds and one and one-half minutes.

In the second bath, just as in the first bath, it is necessary that the precooked slices be oriented for edge confinement, preferably vertically, and also that they be fully submerged. The second rack 15, however, is provided with a larger width or puff space (PS) so that the potatoes can puff up to their natural puffed size. A puff space of approximately one and three-eighths inches has been found to be a good average desirable width. For larger or smaller puffs a width of suitable dimension should be provided. It has also been found desirable to curve the bottom 24 of the second rack in each of the compartments 19 to assist in the random vertical orientation and edge confinement as illustrated in FIG. 10. It is also highly desirable that the potatoes be oriented lengthwise out of edge-to-edge contact, as shown in FIG. 9. If the slices should contact each other upon puffing, flat spots will occur at points of contact except where edge-to-edge contacts occur.

The intermediate product is prepared by including all of the steps set forth above until the partially puffed slices are removed from the first hot oil bath at 275° F. While the first bath slices remain in the first rack they are permitted to drain for a short period of time, not exceeding one minute. The drain is desirable to reduce the fat or oily content of the frozen intermediate product. Thereafter the prepuffed or partially ruptured potato slices are plunged for approximately five seconds in a hot oil or fat bath at a temperature between 400° F. and 425° F. It is important, particularly during the short plunge that the partially ruptured potato slices be confined for edge contact, preferably vertically oriented, and fully submerged in the hotter or second bath. It is also important that the partially ruptured or partially prepared potato slices be confined to expand to less than 50 percent of their fully intended or potential expansion. As indicated above, with the average potato confining the expansion during the hot plunge to a maximum of one-half inch produces excellent intermediate slices.

The slices are removed from the hot oil bath and permitted to drain in the rack. Within one to three minutes those slices which have been fully ruptured, but not completely puffed, will slowly collapse. Their thickness will be reduced to a thickness only slightly wider than the original raw slices. Although the exterior portion of the slices will be sealed and partially cooked, the interior portion will not be.

After cooling and collapsing, the intermediate product is then ready for freezing. Good results have been obtained when the intermediate prepuffed potato slices are layered 12 in each layer, and separated by freezer paper or similar preparation. They may then be placed in a deep freeze and frozen and stored for a considerable period of time. In addition, normal refrigeration will serve to keep the partially puffed slices ready for ultimate puffing for about the same period of time as a French fried potato may be held in a refrigerator.

The apparatus described generally above which may be usefully employed in connection with the method is set forth in detail in the drawings. As will be noted, the first bath 10 is represented as a deep fat fryer or similar-type unit which has rheostat temperature control 25 and a direct-reading thermometer 26. The first bath 10, as indicated above, is held desirably at 275° F., as indicated. The second bath 11 is similar to the first bath 10 in that it also employs a rheostat temperature control 25 and a direct-reading thermometer 26, and the temperature is held in the range of 400° to 425°F. It will be appreciated that for restaurant usage the second bath for reconstituting the frozen slices may well be substantially larger than that shown, and it may be also conveniently provided with a rack over the top whereby the radiant heat from the bath may be employed to preheat the frozen slices to eliminate the locked-in ice crystals and bring them up to a second bath reconstituting and final puffing preheat condition.

The first rack 14 is fabricated from a one-half inch wire mesh. The wire is employed because it permits a maximum of circulation and induces a minimum of heat loss. The first rack shown includes a first rack lid or top 16 which is generally rectangular with chamfered corners 28 and a bottom 29 of approximately the same configuration. A first rack handle 30, which is formed from a single wire doubled back upon itself, is secured by weldments 31 to the top or lid 16.

A plurality of vertical dividers 32 are provided on one-half inch centers in parallel relationship and connected to the lid 16 and the bottom 29 so as to define a plurality of slots 34 having open ends 22. As will be observed in FIG. 6, the slots 34 are of height between ten and fifty percent greater than the height of the slices to be inserted. It will be further observed that the proportion is such that a partial rupturing or puffing of the role of raw slices 20 can be accomplished within the slots 24, the first rack 14 removed, and after collapsing, the slices can be dumped out the open end 22. The slot width S (see FIG. 6) is one-fourth one-half inch. In the event the width is one-fourth inch, a three-sixteenth inch slice will not prepuff to that degree which prepares it properly for the second hot bath, or for the intermediate freezing step. On the other hand, if the width S is one inch or greater, too much puffing may well occur in the first step, and reduce the yield in the final step, or in the alternative, require perforating or spoilage of the puffed slice prior to collapsing and freezing the intermediate product. While the precise dimension is not considered critical, a dimension of the width S which permits only partial puffing in the first bath is considered desirable for high yield.

The second rack 15 illustrated in FIGS. 8 through 10 inclusive has a pair of opposed end walls 35 with a rounded or scalloped bottom. The curved bottom 24 extends upwardly to form opposed parallel ends 36 as thus illustrated in FIG. 10. All of the members are formed of one-half inch wire mesh as is the first rack 14. Vertical dividers 38 are provided at each of the top portions of the curved bottoms 24 and define between adjacent members the compartments 19 into which the prepuffed, reconstituted, or first step slices, which are partially ruptured, are inserted as indicated in FIG. 9. The foldable lid 39 is secured by means of hinges 40 to one of the ends 36 of the bottom, and covers the entire area defined by the compartments 19 and is secured in the down position by means of the latch 18. Once the lid is down, as illustrated in FIG. 10, the slices are confined along a general axis by virtue of the curved base 24 and the sidewalls 36 cooperating at a distance to define a puff space P.S. of approximately one and three-eighths inch. It will be noted again in FIG. 10 that the angular disposition of the slices is greater than 45° with the horizontal, and the top edges of the slices of the larger size are within approximately 10 percent of their diameter of the folding lid 39. The phantom lines in FIG. 10 indicate the general configuration to which the slices will puff in the second rack 15 when the same is plunged into the 400°–425° F. bath for thirty seconds to two minutes. The handle 41 is grasped by the operator after the foldable lid 39 is secured to the latch 18, and the second rack 15 dropped into the second bath 11 as indicated. It will be borne in mind that the second bath step will generally be performed in a restaurant, hamburger drive-in, or the like.

What is claimed is:

1. A first hot oil bath rack for making intermediate potato puffs from partially cooked potato slices, having a height corresponding to the height of the whole potato from which such slices were cut, such slices being positioned at substantially vertical orientation within said rack, including
   a plurality of parallel and vertical walls,
   a top lid,
   a perforated bottom base, said walls, lid and bottom base defining a plurality of partial expansion puff space compartments,
   access means to said compartments for introducing and removing potato slices,
   each of said puff space compartments having a height from about ten to about fifty percent greater than the height of the potato slice placed therein, and
   each of said puff space compartments further having a puff space width from about one-half inch to less than about one inch to thereby limit the partial expansion of the potato slices to less than about fifty percent of their full expansion in a subsequent cooking step.

2. A first hot oil bath rack which includes the features of claim 1 above, wherein said top lid and vertical walls are perforated, said bottom base, walls and top lid being wire mesh of a mesh size sufficiently small to retain the potato slices within the puff space compartment.

3. A first hot oil bath rack which includes the features of claim 2 above, wherein said bottom base is substantially planar, and which further includes a handle mounted to the rack for manually lowering and removing said rack from a hot oil bath.